United States Patent
Krishnaswamy et al.

(10) Patent No.: US 8,300,563 B2
(45) Date of Patent: Oct. 30, 2012

(54) AGGREGATED TRANSMISSION IN WLAN SYSTEMS WITH FEC MPDUS

(75) Inventors: Dilip Krishnaswamy, Carmichael, CA (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 11/529,986

(22) Filed: Sep. 29, 2006

(65) Prior Publication Data

US 2008/0080437 A1 Apr. 3, 2008

(51) Int. Cl.
- H04B 7/00 (2006.01)
- H03M 13/00 (2006.01)
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ......... 370/310; 370/216; 714/752; 714/774
(58) Field of Classification Search ................. 370/349, 370/242, 310; 714/752, 774
See application file for complete search history.

(56) References Cited

U.S. PATENT DOCUMENTS

| | | | |
|---|---|---|---|
| 5,699,369 A * | 12/1997 | Guha | 714/774 |
| 2003/0043778 A1 | 3/2003 | Luschi et al. | |
| 2003/0123598 A1 * | 7/2003 | Gollamudi et al. | 375/377 |
| 2003/0131124 A1 * | 7/2003 | Yi et al. | 709/236 |
| 2004/0170186 A1 * | 9/2004 | Shao et al. | 370/412 |
| 2004/0258039 A1 | 12/2004 | Stephens | |
| 2005/0114489 A1 * | 5/2005 | Yonge et al. | 709/223 |
| 2005/0152358 A1 * | 7/2005 | Giesberts et al. | 370/389 |
| 2005/0160346 A1 * | 7/2005 | Yamane | 714/776 |
| 2006/0078001 A1 * | 4/2006 | Chandra et al. | 370/473 |
| 2006/0159120 A1 * | 7/2006 | Kim | 370/465 |
| 2006/0280205 A1 * | 12/2006 | Cho | 370/473 |
| 2007/0058605 A1 * | 3/2007 | Meylan et al. | 370/346 |
| 2007/0133605 A1 * | 6/2007 | Herrmann | 370/473 |
| 2007/0209057 A1 * | 9/2007 | Musson et al. | 725/111 |
| 2007/0291829 A1 * | 12/2007 | Nabetani et al. | 375/219 |
| 2010/0098181 A1 | 4/2010 | Jacobsen et al. | |
| 2010/0172309 A1 | 7/2010 | Forenza et al. | |

* cited by examiner

*Primary Examiner* — Nick Corsaro
*Assistant Examiner* — Edd Rianne Plata
(74) *Attorney, Agent, or Firm* — Kacvinsky Daisak, PLLC

(57) ABSTRACT

A wireless device calculates a number of FEC MPDUs based on an indicator value determined by the quality of the communication channel that are combined with data MPDUs in an aggregated data packet. The wireless device uses the indicator value to calculate an expected error transmission rate to dynamically adjust the number of FEC MPDUs in the aggregated data packet to reduce data retransmissions.

12 Claims, 3 Drawing Sheets

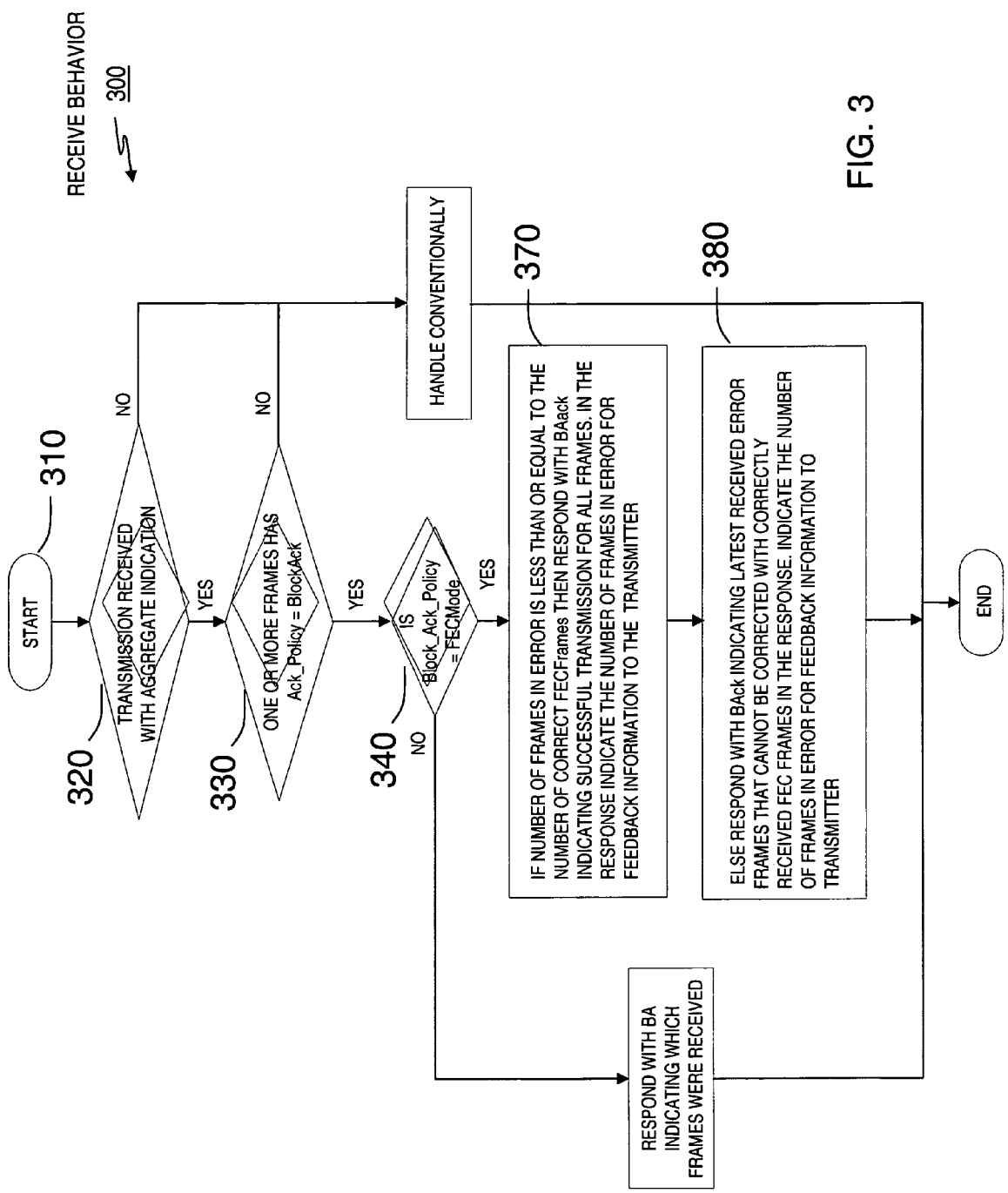

AGGREGATED TRANSMISSION IN WLAN SYSTEMS WITH FEC MPDUS

Recent developments in a number of different digital technologies have greatly increased the need to transfer large amounts of data from one device to another or across a network to another system. Technological developments permit digitization and compression of large amounts of voice, video, imaging, and data information, which may be rapidly transmitted from computers and other digital equipment to other devices within the network. Computers have faster central processing units and substantially increased memory capabilities, which have increased the demand for devices that can more quickly transfer larger amounts of data.

These developments in digital technology have stimulated a need for utilizing the spectrum used for wireless interconnection within these networks and controlling the protocol overheads prior to actual transmission of a message. Various overheads have been proposed to provide improved performance in transmission times in networks that adhere to the emerging protocol standards. Further improvements in transmissions, such as in data packet transmissions, are needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a flow diagram that illustrates a method of determining a number of FEC MPDUs to include with MPDUs to improve transmission of aggregated data packets in accordance with the present invention.

Figure 1:
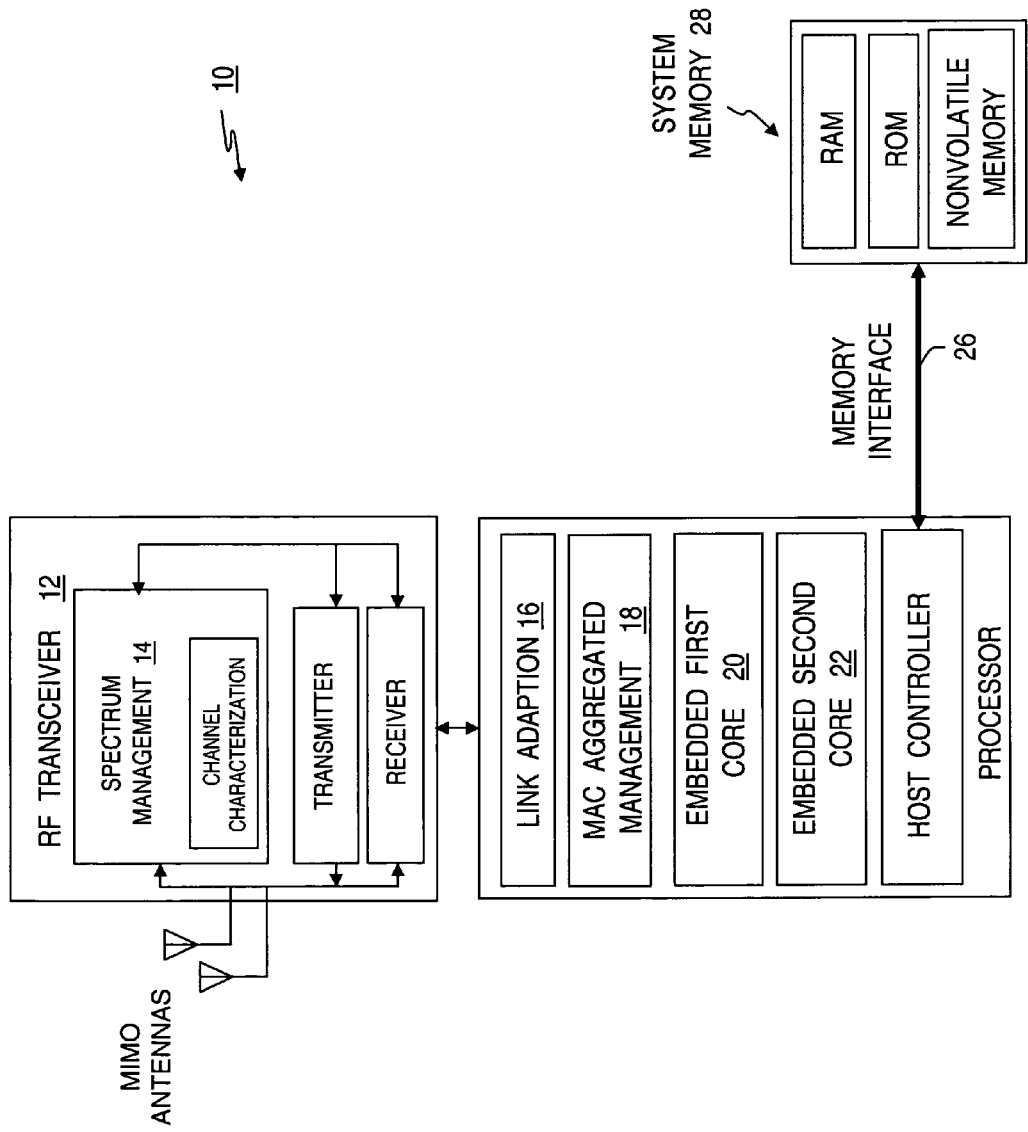
FIG. 1 is a diagram that illustrates a wireless device that incorporates circuitry and an algorithm to efficiently transmit aggregated data packets in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As shown in FIG. 1, wireless communications device 10 includes a radio to allow communication in an RF/location space with other devices. Accordingly, communications device 10 may operate in a wireless network such as, for example, a Wireless Local Area Network (WLAN), a Wireless Personal Area Network (WPAN), or a combination thereof. Communications device 10 is any type of wireless device capable of communicating in an RF/location space with another device that is capable of using an algorithm that monitors and controls packet aggregation techniques to improve the performance and effective throughput in networks.

The figure illustrates a transceiver 12 that both receives and transmits a modulated signal from multiple antennas. The illustrated embodiment for a Multiple-in, Multiple-out (MIMO) system utilizes multiple antennas at both the transmitter and receiver side to provide that independent data streams are simultaneously transmitted from different antennas. The use of this MIMO system may take advantage of spatial multiplexing to increase wireless bandwidth and range in providing a significant capacity gain over conventional single antenna systems. The MIMO system may comprise a number of types of antenna including an omni-directional antenna, a directional antenna, or high-gain antennas, among others, and even a combination of antenna types. The omni-directional antennas may be used for line-of-sight communications with mobile stations spread in all directions. The directional antennas may transmit and receive RF energy more in one direction, and the higher-gain antennas may provide a narrower radiation beam width. However, it should be noted that neither the type of antennas nor the arrangement of antennas used to implement the MIMO algorithm should be considered a limitation of the present invention.

A spectrum management and channel characterization block 14 illustrated in FIG. 1 may be used to monitor characteristics of selected communications channels and adjacent channels. Block 14 may cognitively monitor channel characteristics such as channel signal power and other characteristics to gather parameters and make determinations about the quality of the selected channel and the adjacent channels. Block 14 may use the channel parameters to switch transmission energy profiles in accordance with deteriorating channel conditions. Further, block 14 may calculate an indicator value of the channel quality directly from a received packet. Alternatively, at least one packet may be transmitted over a channel and an indicator value of the channel quality based on the packet transmitted may be received in return. A modulation and coding scheme is then selected for data packets transmitted over the channel that would achieve a desired statistical packet error rate based on the channel quality indicator value. Data packets may be collected using the selected modulation and coding scheme to create an aggregated data transmission.

In some embodiments the transmitted data may be left unprotected from random channel impairment and then it is desirable to include a link adaptation 16 to improve the system performance and quality of service. Link adaptation in wireless communications denotes the matching of the modulation, coding and other signal and protocol parameters to the conditions on the radio link. The dynamic link adaptation process updates signal and protocol parameter changes as the radio link conditions change (e.g. the path loss, the interference due signals coming from other transmitters, the sensitivity of the receiver, the available transmitter power margin, etc.).

Analog front end transceiver 12 may be a stand-alone Radio Frequency (RF) discrete or integrated analog circuit. Transceiver 12 may also be embedded with a processor as a mixed-mode integrated circuit. The processor, in general, processes functions that fetch instructions, generate decodes, find operands, and perform appropriate actions, then stores results. The processor may include baseband and applications processing functions and utilize one or more processor cores 20 and 22 dedicated to handle application specific functions and allow processing workloads to be shared across the cores. The processor may transfer data through an interface 26 to a system memory 28 that may include a combination of memories such as a Random Access Memory (RAM), a Read Only Memory (ROM) and a nonvolatile memory, although neither the type nor variety of memories included in system memory 28 is a limitation of the present invention.

Wireless communications device 10 may operate in a network where a CSMA/CA protocol is used. The Carrier-Sense, Multiple Access/Collision-Avoidance (CSMA/CA) protocol is a network-contention protocol that listens to the network to avoid transmission collisions. Before data signal transmissions and packet delivery across the network, the CSMA/CA protocol broadcasts a signal onto the network to listen for collisions in order to indicate to other devices to refrain from broadcasting.

The architecture of wireless communications device 10 includes, among other layers, a Media Access Control (MAC) layer and a PHY layer. The MAC level operates a MAC aggregated management block 18 to control MAC protocol data units (MPDUs) that dictate the process for moving data packets to and from an interface across a shared channel while the PHY layer provides the hardware for sending and receiving bit stream signals on a carrier through the network. Wireless communications device 10 employs functional logic and various methods in the MAC layer to dynamically create and send information MPDUs in an aggregated transmission along with packet level FEC MPDUs. Forward Error Correction (FEC) is a system of error control for data transmission, a technique that allows the receiver to correct errors in the currently received data.

Based on channel characteristics gathered in spectrum management and channel characterization block 14, the MAC layer generates the MPDUs being aggregated for transmission and a sufficient number of FEC MPDUs. After transmitting the aggregate data and receiving acknowledgements for correctly received packets, the data packets that were not correctly received are retransmitted in the remaining available time. Thus, the number of packets to transmit in the aggregated data transmission is based on the expected packet error rate such that there is time available after the transmission to retransmit the expected failed packets. Further, the number of FEC MPDUs transmitted with the aggregate data may be based on the expected probability of packet errors in the channel.

Figure 2:
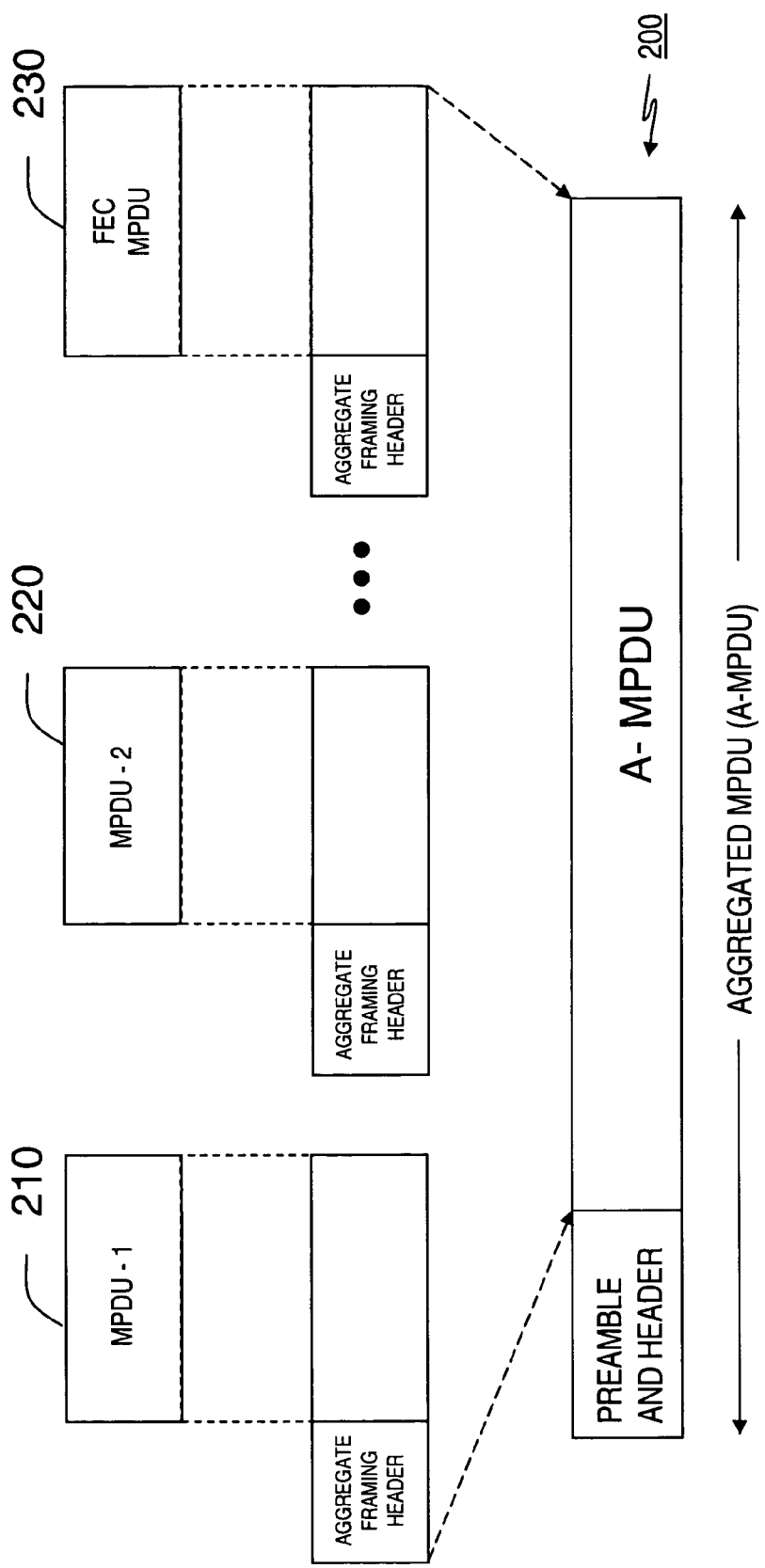
FIG. 2 is a timing diagram that illustrates aggregated data packets in accordance with the present invention.

FIG. 2 illustrates one aggregate data packet denoted as an aggregated MPDU 200 (A-MPDU, Aggregated-MAC Protocol Data Unit). Individual MPDUs 210, 220 and 230 are each prefixed with an aggregate framing header and concatenated in one aggregated protocol data unit denoted as A-MPDU 200 as shown. MPDUs 210, 220 and 230 may be aggregated at the MAC in hardware or in software. One or more of the aggregated MPDUs may be FEC MPDUs 230.

In general, the MAC header contains details of the MPDU that principally include the transmit and receive address that identify the source and destination of the packet on the wireless link, miscellaneous control information and payload encryption information. The payload may contain either a management message or user data. A payload in a transport connection may contain a MAC service data unit (MSDU), fragments of MSDUs, aggregates of MSDUs, aggregates of fragments of MSDUs, bandwidth requests or retransmission requests according to the MAC rules on bandwidth requesting, fragmentation, and packing.

By aggregating data packets, a single block acknowledgement may to be sent for several messages to eliminate the overhead of interframe spacings or physical layer preambles and acknowledgements that accompany each individual packet. However, an aggressive implementation of aggregation may impact overall performance, specifically in implementations which use the same physical layer preamble field which has been used to estimate the channel for the entire duration of the aggregated packet. Put another way, a block acknowledgement sent as a response regarding the proper delivery of the packets that is delayed for a long duration causes a slow link adaptation compared to traditional 802.11a/b/g MACs where an acknowledgement is expect for each MPDU that is transmitted as a PHY packet.

In addition, retransmissions of MPDUs that were not received successfully may be scheduled. The retransmissions have delays due to the aggregated delivery of MPDUs because any retransmissions of an MPDU wait until all MPDUs in the aggregated transmission are delivered, the block acknowledgement is received, and the next opportunity for transmission becomes available. Immediate retransmissions may be attempted in the same TXOP (Transmit Opportunity) time but it could be demanding on the hardware. It is also likely that for large aggregated packet sizes, trailing packets within the aggregated packet may have errors if the channel estimation becomes invalid as time progresses during data transmission of the aggregated packet. Thus, it is desirable to have an aggregated packet length and transmission duration such that the estimation of the channel continues to remain valid and packets are not determined to be in error due to an incorrect estimation of the channel being used for decoding at the receiver.

FIG. 3 shows a flowchart in accordance with various embodiments of the present invention that illustrate an algorithm in accordance with the present invention that may be used to improve the performance and effective throughput in WLAN networks that employ packet aggregation techniques. Method 300 or portions thereof are performed by the processor/transceiver combination of an electronic system. Method 300 is not limited by the particular type of apparatus, software element, or system performing the method. Also, the various actions in method 300 may be performed in the order presented, or may be performed in a different order. Further, in some embodiments, some actions listed in FIG. 3 may be omitted from method 300.

Method 300 is shown beginning at block 310. In block 320 the receiver portion of a device such as, for example, an 802.11 device or an 802.11 derivative device receives a transmission. The received transmission includes an aggregate indication as indicated in the header of the A-MPDU 200. In block 330 a determination is made as to whether one or more received frames have Ack_Policy equal to BlockAck. Ack_Policy denotes which type of acknowledgement is to be used such as, for example, a block acknowledgement, a regular acknowledgement or no acknowledgement. In block 340 a determination is made as to whether Block_Ack_Policy is equal to FECMode. This may be explicitly indicated or inferred by the presence of FEC MPDUs in the aggregate.

Method 300 further shows in block 370 that if the number of received frames in error is less than or equal to the number of correct FECFrames, a BAack response to indicate a successful transmission for all frames is sent. The response includes the number of frames that are in error for feedback information to the transmitter. In block 380 the response includes a BAck signal that indicates the latest received error frames that cannot be corrected with correctly received FEC frames in the response. Again the response may also indicate the number of frames in error for feedback information to the transmitter.

The various embodiments for this invention involve combinations of link adaptation, aggregation, retransmissions and FEC in order to provide optimized transmissions at the physical layer. In some embodiments link adaptation may be done prior to aggregated transmission. Link quality may be estimated based on the success or failure of previous transmissions as indicated by the feedback from the receiver. It is understood that wireless communications device 10 provides wireless transmissions to the channel knowing that some packets in the aggregated transmissions may be received by the receiving device with packet errors. Knowing that errors may occur, wireless communications device 10 may include redundant FEC MPDUs along with data MPDUs to match the expected error rate of transmissions of packets. Thus, wireless communications device 10 dynamically adjusts the combined number of redundant FEC MPDUs and data MPDUs to match or exceed the expected error rate of transmissions of packets in order to alleviate the need for retransmissions.

Based on the modulation and coding schemes chosen for transmission and the available transmit opportunity time TxOP, wireless communications device 10 may estimate the number of bits that should be sent in the TxOP time period. Wireless communications device 10 may use the transmit opportunity time TxOP to provide flexibility in providing longer access to the medium while transmitting higher priority traffic across the channel and shorter access to lower priority traffic. The modulation and coding schemes chosen by wireless communications device 10 may be used to decide how many packets may be aggregated based on the packet size. A block acknowledgement request is sent after the transmission of the aggregated packets and a block acknowledgement is received in response.

As mentioned, based on the expected physical layer packet error rate, wireless communications device 10 may include FEC MPDUs along with the MPDUs for transmission in the aggregated packet transmission. By way of example, if k data MPDUs and (n-k) FEC MPDUs are transmitted in an aggregated packet (n and k are integer values), then as long as any k/n MPDUs are received the aggregated transmission is considered successful. Again, by including redundant FEC MPDUs based on Reed-Solomon coding in the aggregated packet, retransmissions may be avoided. The Block Acknowledgement (BlockAck) signal received in response to the transmitted aggregated packet provides information about which MPDU's in the A-MPDUs are in error.

Method 300 may be extended to include further steps as illustrated by the following example. The transmitting node may send 10 MPDUs and 2 FEC MPDUs for a total of 12 MPDUs. Upon receiving the aggregated transmission the receiving node may determine that three MPDUs are in error. In the receiving node, the two FEC MPDUs would cover for two of the MPDUs received with errors. The receiving node may send a response in its BlockACK signal to the transmitting node indicating the errors in the three MPDUs. The transmitting node may create and make available a number of additional FEC packets/MPDUs that are kept ready during the transmission of the 12 MPDUs. When the transmitting node receives the BlockACK that indicates more MPDUs were in error than the number of FEC MPDUs originally sent, the transmitting node may send one additional FEC MPDUs if time is available in the transmit opportunity time TxOP.

This immediate ability by the transmitting node to respond to the error message from the receiving node is applicable if the MAC protocol allows for an immediate retransmission when the BlockACK signal arrives, otherwise it would not be applicable. In this example the transmitting node does not have to fetch a specific packet/MPDU that is in error. Rather, the transmitting node would send an FEC packet/MPDU that it created and kept available for transmission in the immediate retransmission phase in the MAC protocol.

Note that if the channel coherence time and channel estimate do not remain valid for the duration of transmission and a burst of trailing MPDUs are detected to be in error, wireless communications device 10 may scale back on the number of packets being aggregated. On the other hand, if the trailing MPDUs are determined to not be in error during transmission based on the received block acknowledgement signal, then additional MPDUs may be aggregated into the A-MPDU. Further, wireless communications device 10 may receive link adaptation feedback from a receiving device with suggestions of modulation and coding choices and corresponding PHY packet error rates.

By now it should be apparent that cognitive radio networks may incorporate features of the present invention to improve over-the-air transmissions. A wireless communications device may receive an indicator value indicative of the quality of a communications channel. The received indicator value is used to calculate an expected error transmission rate in a Media Access Control (MAC) layer of the wireless communications device. The wireless communications device selects a modulation and coding scheme to transmit data packets over the channel based on the expected error transmission rate. The wireless communications device dynamically adjusts the number of redundant FEC MPDUs to transmit in the aggregated data packets based on the expected error transmission rate and the chosen modulation and coding choices.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of communicating, comprising:
transmitting at least one packet over a channel and receiving in return an indicator value of the channel quality based on the packet transmitted;
selecting a modulation and coding scheme for data packets transmitted over the channel that would provide a predetermined statistical packet error rate based on the channel quality indicator value;
determining a number of redundant forward error correction (FEC) media access control (MAC) protocol data units (MPDUs) and data MPDUs based on the packet error rate of the data packets transmitted;
aggregating the data packets based on the number of the redundant FEC MPDUs and the data MPDUs;
using the selected modulation and coding scheme to create an aggregated data transmission;
determining a transmit opportunity time based on a priority of the aggregated data transmission;
determining a number of packets to transmit in the aggregated data transmission based on an expected packet error rate and the transmit opportunity time, such that there is remaining available transmit opportunity time after the aggregated data transmission to retransmit expected failed packets; and
retransmitting, during the remaining available transmit opportunity time, data packets that were not correctly received.

2. The method of claim 1 further including transmitting the aggregated data packet.

3. The method of claim 1 further including dynamically adjusting a combined number of redundant FEC MPDUs and data MPDUs to exceed the expected error rate of transmissions of packets in order to alleviate the need for retransmissions.

4. A method of communicating, comprising:
    calculating an indicator value of the channel quality directly from a received packet;
    selecting a modulation and coding scheme for data packets transmitted over the channel that would achieve a desired statistical packet error rate based on the channel quality indicator value;
    determining a number of redundant forward error correction (FEC) media access control (MAC) protocol data units (MPDUs) and data MPDUs based on the packet error rate of the data packets transmitted;
    aggregating the data packets based on the number of the redundant FEC MPDUs and the data MPDUs;
    using the selected modulation and coding scheme to create an aggregated data transmission;
    determining a transmit opportunity time based on a priority of the aggregated data transmission;
    determining a number of packets to transmit in the aggregated data transmission based on an expected packet error rate and the transmit opportunity time, such that there is remaining available transmit opportunity time after the aggregated data transmission to retransmit expected failed packets; and
    retransmitting, during the remaining available transmit opportunity time, data packets that were not correctly received.

5. A method of aggregating data packets, comprising:
obtaining an indicator value that is indicative of channel quality;
    using the indicator value to select a modulation and coding scheme for data packets that would achieve a desired statistical packet error rate;
    determining a ratio of redundant Forward Error Correction (FEC) Media Access Control Protocol Data Units(MPDUs) to data MPDUs based on an expected packet error rate such that the aggregated transmission of the data MPDUs and the FEC MPDUs achieves an overall expected zero packet error rate;
    aggregating the data packets based on the ratio of redundant FEC MPDUs to data MPDUs;
    determining a transmit opportunity time based on a priority of the aggregated data packets; and
    determining a number of data MPDUs and a number of FEC MPDUs in the ratio such that given the selected modulation and coding scheme the aggregated data packets fit in the transmit opportunity time.

6. The method of claim 5 further including combining the FEC MPDUs with the data MPDUs into an aggregated data transmission.

7. The method of claim 6 further including receiving in response to the aggregated data transmission acknowledgements for each of the correctly received MPDUs.

8. The method of claim 7 further including scheduling for retransmission any MPDUs that have not been acknowledged.

9. A wireless device comprising:
    a transceiver coupled to a channel; and
    a processing device that includes a management block, the management block operable to:
        receive an indicator value that is indicative of channel quality and used to calculate an expected error transmission rate and select a modulation and coding scheme,
        determine a first number of redundant Forward Error Correction (FEC) Media Access Control Protocol Data Units(MPDUs) and data MPDUs based on an expected error transmission rate, and
        aggregate data packet transmission in the transceiver based on the number of the redundant FEC MPDUs and the data MPDUs;
        determine a transmit opportunity time based on a priority of the aggregated data packet transmission; and
        determine a second number of data MPDUs and a third number of FEC MPDUs in the ratio such that given the selected modulation and coding scheme the aggregated data packets fit in the transmit opportunity time, such that there is remaining available transmit opportunity time after the transmission to retransmit expected failed packets.

10. The wireless device of claim 9 further including a channel characterization block to calculate an indicator value of the channel quality directly from a received packet.

11. The wireless device of claim 9 wherein the transceiver transmits at least one packet over the channel and an indicator value of the channel quality based on the packet transmitted is received in return.

12. The wireless device of claim 9 wherein a modulation and coding scheme is selected for data packets transmitted over the channel that would achieve a desired statistical packet error rate based on the indicator value of the channel quality.

* * * * *

UNITED STATES PATENT AND TRADEMARK OFFICE
CERTIFICATE OF CORRECTION

PATENT NO. : 8,300,563 B2  
APPLICATION NO. : 11/529986  
DATED : October 30, 2012  
INVENTOR(S) : Dilip Krishnaswamy et al.

Page 1 of 1

It is certified that error appears in the above-identified patent and that said Letters Patent is hereby corrected as shown below:

On sheet 3 of 3, in Figure 3, in Reference Numeral 370, line 2, delete "BAack" and insert -- BAck --, therefor.

Signed and Sealed this
Twenty-second Day of January, 2013

David J. Kappos
*Director of the United States Patent and Trademark Office*